United States Patent
Omodt et al.

(10) Patent No.: US 10,309,771 B2
(45) Date of Patent: Jun. 4, 2019

(54) SYSTEM AND METHOD FOR DETERMINING FACER SURFACE SMOOTHNESS

(71) Applicant: United States Gypsum Company, Chicago, IL (US)

(72) Inventors: Jenner Omodt, Chicago, IL (US); Alfred C. Li, Naperville, IL (US); Michael P. Shake, Johnsburg, IL (US); Weixin D. Song, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 311 days.

(21) Appl. No.: 15/099,082

(22) Filed: Apr. 14, 2016

(65) Prior Publication Data
US 2016/0364852 A1  Dec. 15, 2016

Related U.S. Application Data

(60) Provisional application No. 62/174,341, filed on Jun. 11, 2015.

(51) Int. Cl.
*G01B 11/30* (2006.01)

(52) U.S. Cl.
CPC .................. *G01B 11/30* (2013.01)

(58) Field of Classification Search
CPC ...... G01B 11/30; G01B 11/306; G01B 21/30; G01N 21/57; G06T 11/001; G06T 2207/30124; G06T 7/0004; G06T 7/40; G06T 7/90
See application file for complete search history.

(56) References Cited

U.S. PATENT DOCUMENTS

| | | | |
|---|---|---|---|
| 3,359,146 | A | 12/1967 | Lane et al. |
| 5,320,677 | A | 6/1994 | Baig |
| 6,010,596 | A | 1/2000 | Song |
| 6,409,823 | B1 | 6/2002 | Shake et al. |
| 6,409,824 | B1 | 6/2002 | Veeramasuneni et al. |
| 6,699,364 | B2 | 3/2004 | Song et al. |

(Continued)

FOREIGN PATENT DOCUMENTS

| | | |
|---|---|---|
| CA | 2308552 C | 8/2010 |
| EP | 1663597 B1 | 3/2012 |

(Continued)

OTHER PUBLICATIONS

Santos, Pedro MD, and Eduardo NBS Júlio. "A state-of-the-art review on roughness quantification methods for concrete surfaces." Construction and Building Materials 38 (2013): 912-923.*

(Continued)

*Primary Examiner* — Carol Wang
(74) *Attorney, Agent, or Firm* — Leydig, Voit & Mayer, Ltd.; Philip T. Petti; Pradip K. Sahu

(57) ABSTRACT

Embodiments of a system and a method for determining a surface smoothness of a facing specimen can be used in connection with the manufacture of products, including cementitious products such as gypsum wallboard, for example. Such systems and methods can be used to generate a composite smoothness factor based upon a measured mottle value and topography value using stochastic frequency distribution analysis.

19 Claims, 8 Drawing Sheets

(56) References Cited

U.S. PATENT DOCUMENTS

| | | | |
|---|---|---|---|
| 6,874,930 B2 | 4/2005 | Wittbold et al. | |
| 7,544,242 B2 | 6/2009 | Liu et al. | |
| 7,572,328 B2 | 8/2009 | Lettkeman et al. | |
| 7,572,329 B2 | 8/2009 | Liu et al. | |
| 7,601,214 B2 | 10/2009 | Blackburn et al. | |
| 7,608,347 B2 | 10/2009 | Lettkeman et al. | |
| 7,637,996 B2 | 12/2009 | Blackburn et al. | |
| 7,731,794 B2 | 6/2010 | Yu et al. | |
| 7,767,019 B2 | 8/2010 | Liu et al. | |
| 7,776,461 B2 | 8/2010 | Blackburn et al. | |
| 7,776,462 B2 | 8/2010 | Liu et al. | |
| 7,932,308 B2 | 4/2011 | Lettkeman et al. | |
| 8,070,895 B2 | 12/2011 | Engbrecht et al. | |
| 8,088,218 B2 | 1/2012 | Blackburn et al. | |
| 8,142,915 B2 | 3/2012 | Blackburn et al. | |
| 8,323,785 B2 | 12/2012 | Yu et al. | |
| 8,329,308 B2 | 12/2012 | Liu et al. | |
| 8,331,816 B2* | 12/2012 | Sheflin | G03G 15/5041 399/60 |
| RE44,070 E | 3/2013 | Yu et al. | |
| 8,475,762 B2 | 7/2013 | Li et al. | |
| 8,568,544 B2 | 10/2013 | Engbrechh et al. | |
| 8,597,426 B2 | 12/2013 | Lee et al. | |
| 8,974,925 B1 | 3/2015 | Cao et al. | |
| 9,328,025 B2 | 5/2016 | Blackburn et al. | |
| 9,840,066 B2 | 12/2017 | Yu et al. | |
| 10,053,860 B2 | 8/2018 | Li et al. | |
| 2005/0064164 A1 | 3/2005 | Dubey et al. | |
| 2006/0278127 A1 | 12/2006 | Liu et al. | |
| 2006/0278128 A1 | 12/2006 | Liu et al. | |
| 2006/0278132 A1 | 12/2006 | Yu et al. | |
| 2006/0280898 A1 | 12/2006 | Lettkeman et al. | |
| 2006/0280899 A1 | 12/2006 | Liu et al. | |
| 2006/0281837 A1 | 12/2006 | Lettkeman et al. | |
| 2007/0044687 A1 | 3/2007 | Blackburn et al. | |
| 2007/0048490 A1 | 3/2007 | Yu et al. | |
| 2007/0048549 A1 | 3/2007 | Song et al. | |
| 2007/0059513 A1 | 3/2007 | Yu et al. | |
| 2007/0251628 A1 | 11/2007 | Yu et al. | |
| 2008/0000392 A1 | 1/2008 | Blackburn et al. | |
| 2008/0009565 A1 | 1/2008 | Wittbold et al. | |
| 2008/0069762 A1 | 3/2008 | Lynn et al. | |
| 2008/0148997 A1 | 6/2008 | Blackburn et al. | |
| 2008/0190062 A1 | 8/2008 | Engbrecht et al. | |
| 2009/0029141 A1 | 1/2009 | Shake et al. | |
| 2010/0143682 A1 | 6/2010 | Shake et al. | |
| 2010/0231708 A1 | 9/2010 | Rosenberger | |
| 2010/0247937 A1 | 9/2010 | Liu et al. | |
| 2010/0291305 A1 | 11/2010 | Wittbold et al. | |
| 2011/0030453 A1 | 2/2011 | Shake et al. | |
| 2011/0046898 A1 | 2/2011 | Li et al. | |
| 2011/0213043 A1 | 2/2011 | Shake et al. | |
| 2011/0054053 A1 | 3/2011 | Lee et al. | |
| 2011/0192518 A1 | 8/2011 | Li | |
| 2011/0195241 A1 | 8/2011 | Yu et al. | |
| 2011/0214491 A1 | 9/2011 | Weinberger et al. | |
| 2012/0040168 A1 | 2/2012 | Engbrecht et al. | |
| 2012/0168527 A1 | 7/2012 | Li et al. | |
| 2012/0170403 A1 | 7/2012 | Li et al. | |
| 2012/0172468 A1 | 7/2012 | Blackburn et al. | |
| 2013/0098268 A1 | 4/2013 | Li et al. | |
| 2013/0099418 A1 | 4/2013 | Li et al. | |
| 2013/0100759 A1 | 4/2013 | Wittbold et al. | |
| 2013/0208285 A1* | 8/2013 | Miettinen | G01N 21/251 356/600 |
| 2013/0216717 A1 | 8/2013 | Rago et al. | |
| 2013/0216762 A1 | 8/2013 | Chan et al. | |
| 2013/0308411 A1 | 11/2013 | Wittbold et al. | |
| 2014/0113124 A1 | 4/2014 | Sang et al. | |
| 2014/0113128 A1 | 4/2014 | Sang et al. | |
| 2014/0272404 A1 | 9/2014 | Shake et al. | |
| 2015/0010767 A1 | 1/2015 | Sang et al. | |
| 2015/0024228 A1 | 1/2015 | Li et al. | |
| 2015/0103861 A1 | 4/2015 | Cao et al. | |
| 2015/0104629 A1 | 4/2015 | Cao et al. | |
| 2015/0125683 A1 | 5/2015 | Cao et al. | |
| 2015/0360439 A1 | 12/2015 | Li et al. | |
| 2016/0040427 A1 | 2/2016 | Li et al. | |
| 2016/0052168 A1 | 2/2016 | Li | |
| 2016/0069070 A1 | 3/2016 | Li | |
| 2016/0364852 A1 | 12/2016 | Omodt et al. | |
| 2016/0375655 A1 | 12/2016 | Li et al. | |
| 2016/0375656 A1 | 12/2016 | Li et al. | |
| 2017/0096369 A1 | 4/2017 | Vilinska et al. | |
| 2017/0152177 A1 | 6/2017 | Vilinska et al. | |
| 2017/0210029 A1 | 7/2017 | Li et al. | |
| 2017/0326839 A1 | 11/2017 | Shake et al. | |
| 2017/0334778 A1 | 11/2017 | Vilinska et al. | |
| 2017/0362124 A1 | 12/2017 | Sang et al. | |
| 2018/0119417 A1 | 5/2018 | Li et al. | |
| 2018/0305257 A1 | 10/2018 | Lu et al. | |

FOREIGN PATENT DOCUMENTS

| | | |
|---|---|---|
| WO | WO 2006/138273 A2 | 12/2006 |
| WO | WO 2006/138277 A2 | 12/2006 |
| WO | WO 2007/027530 A2 | 3/2007 |
| WO | WO 2011/028817 A1 | 3/2011 |
| WO | WO 2012/116325 A1 | 8/2012 |
| WO | WO 2014/066207 A1 | 5/2014 |
| WO | WO 2014/066283 A1 | 5/2014 |
| WO | WO 2015/050804 A1 | 4/2015 |
| WO | WO 2016/209942 A1 | 12/2016 |
| WO | WO 2017/058316 A1 | 4/2017 |
| WO | WO 2017/196644 A1 | 11/2017 |
| WO | WO 2017/218061 A1 | 12/2017 |
| WO | WO 2018/009611 A1 | 1/2018 |

OTHER PUBLICATIONS

Lange, D. A., H. M. Jennings, and S. P. Shah. "Analysis of surface roughness using confocal microscopy." Journal of Materials Science 28, No. 14 (1993): 3879-3884.*

Juuti, Mikko, Tuukka Prykäri, Erkki Alarousu, Hanna Koivula, Markko Myllys, Arto Lähteelä, Martti Toivakka, Jussi Timonen, Risto Myllylä, and Kai-Erik Peiponen. "Detection of local specular gloss and surface roughness from black prints." Colloids and Surfaces A: Physicochemical and Engineering Aspects 299, No. 1-3 (2007): 101-108.*

Burrows, "A Decade's Experience of Gypsum Board Weight Reduction in the U.S.", 14. Internationale Baustofftagung 1.0197-1.0207 (Weimar, Sep. 20-23, 2000).

Canet et al., "Influence of mottle on color reproduction," Techcom, The Quebec Institute of Graphic Communications 12(1): 205-213 (2014).

Josh et al., "Effect of ink transfer on print mottle in shrink films," *Journal of Coatings Technology and Research*, 12(1): 205-213 (2014).

Mangin et al., "Fundamental Questions on Print Quality," *Proc. of SPIE-IS&T Electronic Imaging*, 6059: 605901-1-605901-12 (2006).

Rosenberger, Mottle Measurement of Wet Trap, Back Trap and Other Motley Images, New Mottle Algorithim (Sep. 12, 2002) Retrieved from the Internet:URL:http://www.verityia.com/pdf/measuremen t-motley-images.pdf [retrieved on Sep. 12, 2002].

Rosenberger, "Stochastic Frequency Distribution Analysis as Applied to Ink Jet Print Mottle Measurements," NIP17: International Conference on Digital Printing Technologies 808-812 (2001).

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

European Patent Office, International Search Report and the Written Opinion in International Application PCT/US2016/035632 (dated Aug. 12, 2016).

(56) References Cited

OTHER PUBLICATIONS

European Patent Office, International Preliminary Report on Patentability inInternational Application PCT/US2016/035632 (dated Dec. 21, 2017).

* cited by examiner

SYSTEM AND METHOD FOR DETERMINING FACER SURFACE SMOOTHNESS

CROSS-REFERENCE TO RELATED APPLICATION

This patent application claims the benefit of priority to U.S. Provisional Patent Application No. 62/174,341, filed Jun. 11, 2015, and entitled, "System and Method for Determining Facer Surface Smoothness," which is incorporated in its entirety herein by this reference.

BACKGROUND

The present disclosure relates to continuous board manufacturing processes and, more particularly, to a system and method for determining facer surface smoothness in connection with the manufacture of a cementitious article.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Also, many specialty materials, such as materials useful for modeling and mold-making, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. In the manufacture of cementitious articles, the cementitious slurry and desired additives are often blended in a continuous mixer, as described in U.S. Pat. No. 3,359,146, for example.

In a typical cementitious article manufacturing process such as wallboard, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of facing material supported by a forming table.

The foamed slurry is allowed to spread over the advancing web. A second web of facing material is applied to cover the foamed slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam.

Different properties of the facing material may affect the performance and appearance of the cementitious product formed using the facing material. For example, the smoothness of the facing material can affect the visual appearance made by the cementitious product once installed in its end-use application. Conventionally, the smoothness of facing material has been measured in a subjective manner. As a result, it can be difficult for manufacturers of cementitious products to convey to facing material suppliers a specification for the facing material to meet and to customers the degree of smoothness the cementitious product has.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for determining a surface smoothness of a facing specimen. In one embodiment, a system for determining a surface smoothness of a facer surface of a facing specimen includes a digital imaging device; a non-transitory, computer-readable medium; and a surface analyzing processor.

The digital imaging device is configured to generate a digital image. The digital imaging device includes a housing, a transparent panel, and at least one image sensor. The housing defines a scanning area. The transparent panel is mounted to the housing over the scanning area. Each image sensor is configured to generate digital image data relating to the facer surface placed upon the transparent panel for generating the digital image.

The non-transitory, computer-readable medium bears a surface analyzing application. The surface analyzing processor is in operable arrangement with the digital imaging device to receive the digital image therefrom. The surface analyzing processor is in operable arrangement with the non-transitory, computer-readable medium to execute the surface analyzing application.

The surface analyzing application includes a mottle computational module, a topography computational module, and a composite smoothness computational module. The mottle computational module is configured to determine a mottle value for the facer surface based upon the digital image. The topography computational module is configured to determine a topography value for the facer surface based upon the digital image. The composite smoothness computational module is configured to determine a composite smoothness value based upon the mottle value and the topography value for the facer surface.

In another aspect of the present disclosure, embodiments of a method of determining a surface smoothness of a facing specimen are described. In one embodiment of a method of determining a surface smoothness of a facing specimen, the facing specimen is placed upon a transparent panel of a digital imaging device such that a facer surface of the facing specimen is disposed over a scanning area of the digital imaging device. The digital imaging device is operated to generate a digital image of the facer surface of the facing specimen. The digital image is transmitted to a surface analyzing processor. The surface analyzing processor is used to execute a surface analyzing application stored upon a non-transitory computer-readable medium. The surface analyzing application determines a mottle value for the facer surface based upon the digital image, determines a topography value for the facer surface based upon the digital image, and determines a composite smoothness value based upon the mottle value and the topography value for the facer surface.

Further and alternative aspects and features of the disclosed principles will be appreciated from the following detailed description and the accompanying drawings. As will be appreciated, the systems and techniques for determining surface smoothness of a facer disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF EXEMPLARY EMBODIMENTS

The present disclosure provides various embodiments of a system and a method for determining a surface smoothness of a facing specimen that can be used in connection with the manufacture of products, including cementitious products such as gypsum wallboard, for example. Embodiments of a system and a method for determining a surface smoothness of a facing material following principles of the present disclosure can be used in a manufacturing process to effectively measure a surface smoothness of a facing material used to manufacture the cementitious products, such as a paper cover sheet and/or a glass mat used in the manufacture of gypsum wallboard, for example.

Embodiments of a system and a method for determining a surface smoothness of a facing material following principles of the present disclosure can be used to produce an objective, numerical value that quantifies the surface smoothness of various composite facers. In embodiments, the numerical smoothness value generated using principles of the present disclosure can be used to differentiate between facers beyond subjective assessments made by the human eye or sense of touch/feel.

Figure 1:
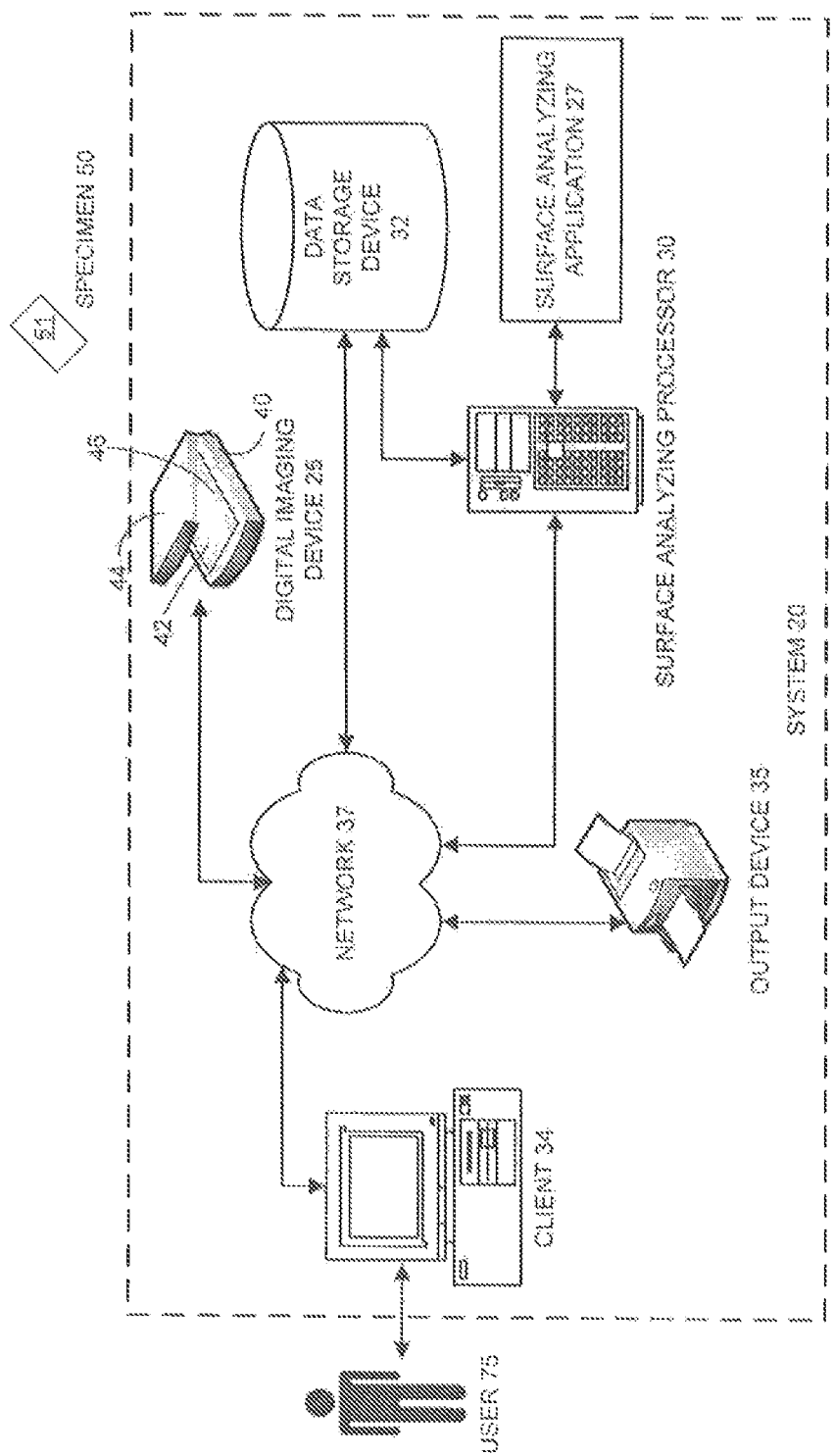
FIG. 1 is a diagrammatic view of an embodiment of a system for determining a surface smoothness of a facing specimen constructed in accordance with principles of the present disclosure.

Turning now to the Figures, an embodiment of a system 20 for determining a surface smoothness of facer surface of a facing specimen constructed according to principles of the present disclosure is shown in FIG. 1. The system includes a digital imaging device 25; a non-transitory, computer-readable medium 27 bearing a surface analyzing application; a surface analyzing processor 30 which is configured to execute the surface analyzing application 27; a data storage device 32; a client 34; an output device 35; and a network 37 interconnecting the various components of the system 20.

In embodiments, the digital imaging device 25 is in the form of a digital scanner that includes a housing 40 which defines a scanning area 42 at its top and a cover 44 hinged to the housing 40 such that the cover 44 is pivotally movable over a range of travel between a closed position, in which it is disposed in overlaying relationship to the scanning surface 42, and an open position (such as is shown in FIG. 1). The scanning area 42 is covered by a transparent panel 46 made of a suitable transparent material (e.g., glass or plastic). A specimen 50 can be placed upon the transparent panel 46 over the scanning area 42 in a position for surface analysis of a facer surface 51 thereof by the surface analyzing processor 30 via a digital image generated by the digital imaging device 25.

The surface analyzing processor 30 is in operable arrangement with the digital imaging device 25 to receive a digital image therefrom. The surface analyzing processor 30 is in operable arrangement with the non-transitory, computer-readable medium to execute the surface analyzing application 27.

In embodiments, the surface analyzing processor 30 can generally include any component of an application that can receive input from a client, process the input, present the input to the surface analyzing application 27, and present output from the surface analyzing processor 30 to the client 34 and/or to the data storage device 32, and execute logic for the surface analyzing application 27.

The surface analyzing application 27 includes a mottle computational module, a topography computational module, and a composite smoothness computational module. The mottle computational module is configured to determine a mottle value for the facer surface based upon the digital image. The topography computational module is configured to determine a topography value for the facer surface based upon the digital image. The composite smoothness computational module is configured to determine a composite smoothness value based upon the mottle value and the topography value for the facer surface.

The surface analyzing application 27 contains computer executable instructions adapted to exchange information in the form of data with the data storage device 32. The surface analyzing application 27 can include a graphical user interface which can facilitate the input of data into the application 27 and instructions to the surface analyzing application 27 regarding the digital image produced by the digital imaging device 25.

The surface analyzing application 27 can also contain a report engine, which can be provided to generate displays of information stored in the data storage device 32 concerning the surface smoothness data generated by the system, which can be viewed using the output device 35 or the graphical user interface through the client 34, for example. In one embodiment, the report engine further provides pre-configured and/or ad hoc reports relating to the surface smoothness of one or more specimens 50 based on reference data stored in the data storage device 32.

The database or data storage device 32 can generally include any type of system for storing data in non-volatile storage. This includes, but is not limited to, systems based upon: magnetic, optical, and magneto-optical storage devices, as well as storage devices based on flash memory and/or battery-backed up memory.

In embodiments, the system 20 includes the client 34 in communication with the surface analyzing processor 30 through the network 37. The client 34 can be used to host a utility interface in the form of a graphical user interface of the surface analyzing application 27. The graphical user interface can be adapted to facilitate the input of information into the surface analyzing application 27 and the display of outputs from the application 27. The client 34 can generally include any node on a network including computational capability and including a mechanism for communicating across the network 37.

In one embodiment, the client 34 hosts an application front end of the surface analyzing application 27. The application front end can generally include any component of the surface analyzing application 27 that can receive input from the client 34, communicate the input to the surface analyzing application 27, receive output from the surface analyzing application 27, and present the output to the user 75 via the client 34. In one embodiment, the application front end can be a stand-alone system.

The network 37 can generally include any type of wired or wireless communication channel capable of coupling together computing nodes. Examples of a suitable network include, but are not limited to, a local area network, a wide area network, or a combination of networks.

As can be appreciated, the system 20 can include a number of computer systems, which generally can include any type of computer system based on: a microprocessor, a mainframe computer, a digital signal processor, a portable computing device, a personal organizer, a device controller of a computational engine within an appliance. For example, the surface analyzing processor 30 and related systems may be implemented in one or more electronic devices that are located in one or more locations.

In addition to the components discussed above, the system 20 can further include one or more of the following: a host server or other computing systems including a processor for processing digital data; an input digitizer coupled to the processor for inputting digital data; an application program stored in the memory and accessible by the processor for directing processing of digital data by the processor; a display device coupled to the processor and memory for displaying information derived from digital data processed by the processor, and a plurality of databases.

Figure 2:
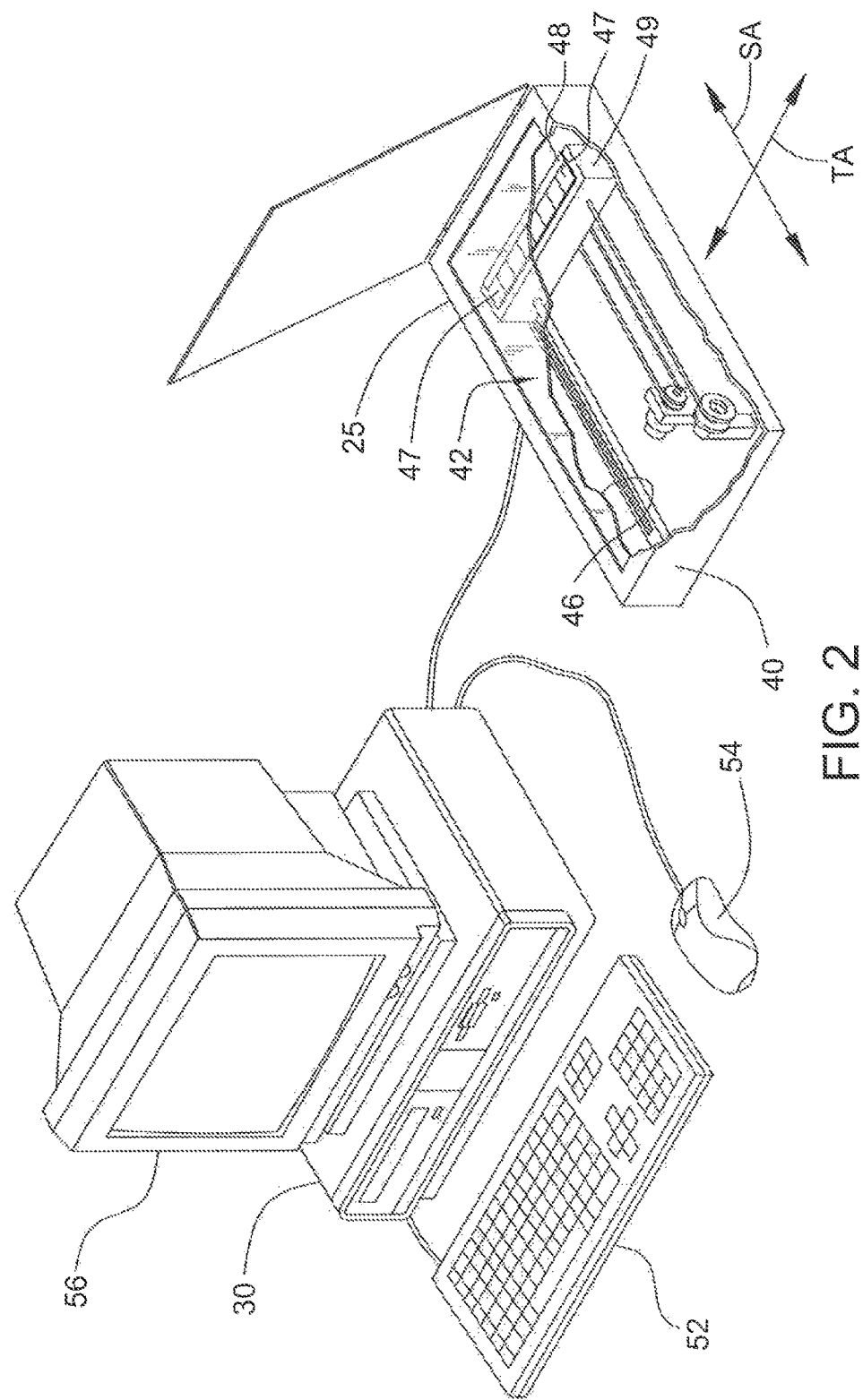
FIG. 2 is a perspective view of an exemplary embodiment of a processor and a digital imaging device suitable for use in the system of FIG. 1.

Referring to FIG. 2, in embodiments, the digital imaging device 25 can comprise a suitable, commercially-available scanner which is configured to produce a digital image with a sufficient resolution (e.g., 600 pixels per inch (ppi) or greater). In embodiments, the digital imaging device 25 can be a commercially-available scanner from Epson America, Inc., of Long Beach, Calif., such as, the Epson® Perfection® V750 Pro scanner, for example.

The digital imaging device 25 includes the housing 40, the transparent panel 46, and at least one image sensor 47. The housing defines the scanning area 42. The transparent panel 46 is mounted to the housing 40 over the scanning area 42.

In the illustrated embodiment, a light source 48 and a carriage 49 are disposed within the housing 40 of the digital imaging device 25. The carriage 49 is movable over a range of travel such that the carriage 49 is movable over the entire scanning area 42. The carriage 49 holds an array of suitable image sensors 47, as will be readily understood by one skilled in the art. The digital imaging device 25 can also include a power source that can be configured to selectively operate the carriage 49, the light source 48, and other components of the digital imaging device 25, as will be understood by one skilled in the art.

Each image sensor 47 is configured to generate a digital image of the facer surface when the facing specimen is placed upon the transparent panel. In embodiments, the image sensors 47 comprise a collection of light-sensitive diodes or photosites. The digital imaging device 25 can be configured to convert the amount of light sensed by the image sensors 47 into a suitable digital image of the facer surface 51 of the specimen 50 placed upon the scanning surface 42 (see FIG. 3).

In embodiments, the light source 48 of the digital imaging device 25 is disposed within the housing and configured to illuminate the facer surface 51 when the facing specimen 50 is placed upon the transparent panel 46. In the illustrated embodiment, the light source 48 is mounted to the carriage 49.

Figure 3:
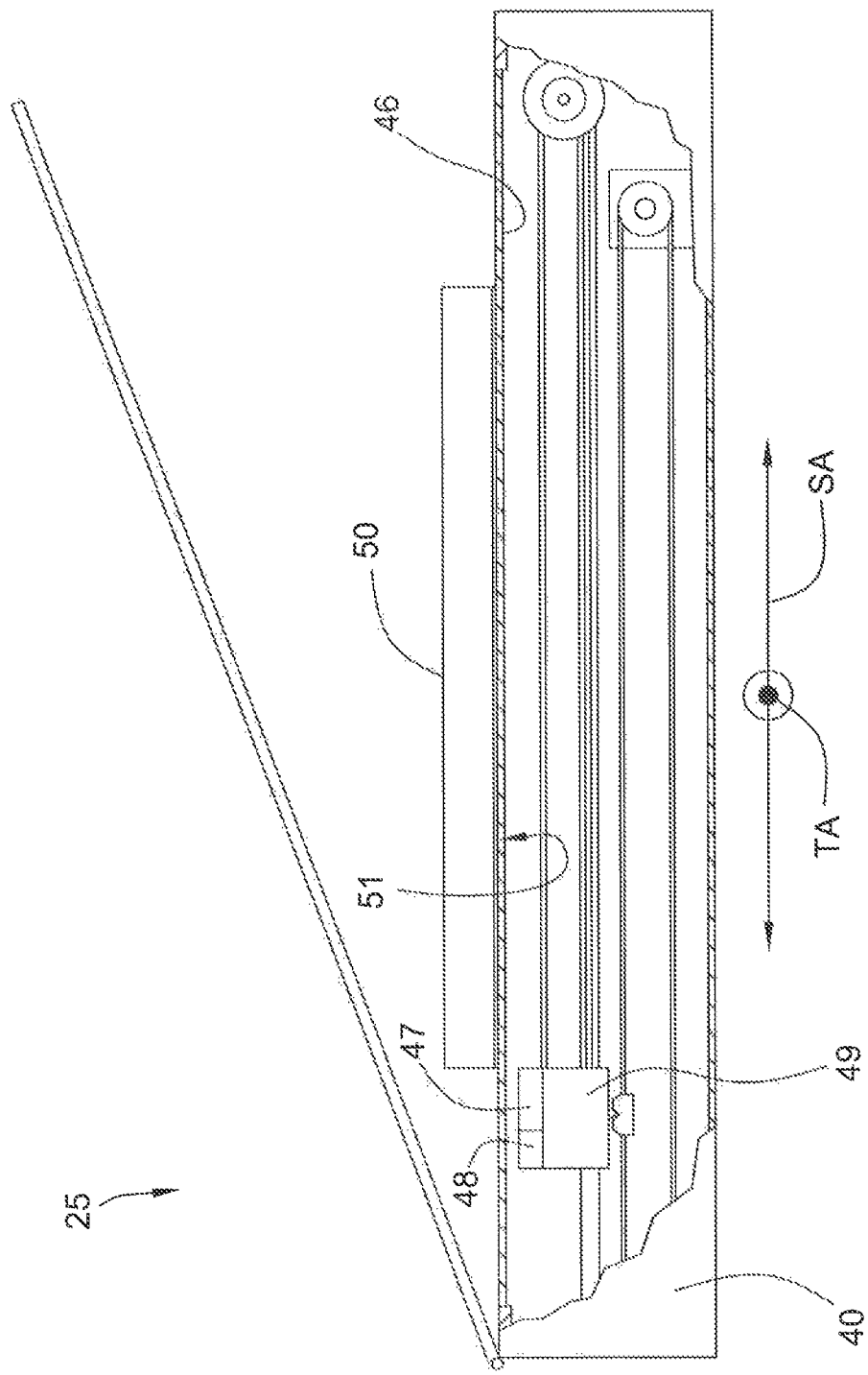
FIG. 3 is a sectional view of the digital imaging device of FIG. 2, illustrating a facer specimen placed upon a transparent panel of the digital imaging device.

Referring to FIGS. 2 and 3, in use, the carriage 49 moves the array of image sensors 47 from one edge of the scanning area 42 to an opposite edge thereof to effectively obtain a digital image of the entire scanning area 42. The carriage 49 is reciprocally movable over a range of travel along a scanning axis SA to traverse the scanning area 42. In the illustrated embodiment, the carriage 49 extends along a transverse axis TA, which is substantially perpendicular to the scanning axis SA, substantially across the scanning area 42 such that the carriage 49 covers the scanning area 42 in a single pass. In embodiments, each image sensor 47 is mounted to the carriage 49 such that the digital image is generated by moving the carriage 49 along the scanning axis SA over the scanning area 42.

In embodiments, each of the array of image sensors 47 is configured to convert an amount of light sensed by each respective image sensor into a luminance value signal. The digital image includes luminance data corresponding to the luminance value signals respectively generated by the array of image sensors 47 over a matrix of pixels defining the digital image.

The light source 48 can be configured to selectively illuminate the scanning area 42. In embodiments, the light source 48 can be configured to direct illumination at an angle relative to a plane defined by the transparent panel 46. For example, in embodiments, the light source 48 directs light at an angle of about 45° relative to the plane defined by the transparent panel 46.

The light source 48 can be selectively operated to illuminate the facer surface 51 of the specimen 50 being analyzed 25. The light striking the facer surface 51 of the specimen 50 can have a variable reflective effect at or near regions of the facer surface 51 of the specimen 50 which are uneven (e.g. regions of the facer surface 51 of the specimen 50 which are lower than adjacent regions can be darker than the high spots). The image sensors 47 can be configured such that such variations in luminance, although potentially imperceptible to the human eye, can be detected by the image sensors 47. The detected variations in light over the facer surface 51 of the specimen 50 can be recorded in the digital image produced as a relative decrease or increase in the luminance value of pixels in the particular region.

In embodiments, the digital imaging device 25 is configured to produce a digital image at a resolution of 600 ppi or greater. In other embodiments, the digital imaging device 25 is configured to produce a digital image having a different, suitable resolution. In embodiments, the digital imaging device 25 is configured to produce a color digital image or a grayscale digital image.

The surface analyzing processor 30 is operably arranged with the digital imaging device 25 to receive the digital image (in the form of digital image information) from the digital imaging device 25. The surface analyzing processor 30 is configured to manipulate the digital image information received from the digital imaging device 25, to convert that information into a digital image which can be stored in a data storage device operably arranged with the surface analyzing processor 30, and to transmit the digital image information to the surface analyzing application to analyze the smoothness of the surface of the specimen 50 of which the digital image information relates.

In embodiments, the surface analyzing processor 30 can comprise any suitable computing device, such as, a microprocessor, a mainframe computer, a digital signal processor, a portable computing device, a personal organizer, a device controller, or a computational engine within an appliance. In embodiments, the surface analyzing processor 30 can comprise a personal computer as is widely available for home and business use. In embodiments, the surface analyzing processor 30 includes one or more input devices 52, 54 (e.g., a keyboard 52 and a mouse 54) and a display device 56.

In embodiments, the surface analyzing application includes a graphical user interface module configured to receive input from a user and to display output from the surface analyzing application. The graphical user interface of the surface analyzing application can be displayed by the display device 56. The display device 56 can be operably arranged with the surface analyzing processor 30 to display the graphical user interface using any suitable technique. The graphical user interface can be used to facilitate the inputting of commands and data by the user 75 to the surface analyzing application 27 and to display outputs generated by the surface analyzing application 27.

The surface analyzing application 27 can be stored upon any suitable computer-readable storage medium. For example, in embodiments, a surface analyzing application following principles of the present disclosure can be stored upon a hard drive, floppy disk, CD-ROM drive, tape drive, zip drive, flash drive, optical storage device, magnetic storage device, and the like.

In embodiments, a surface analyzing application following principles of the present disclosure can be configured to implement an embodiment of a smoothness testing protocol according to principles of the present disclosure. In embodiments, a surface analyzing application can be based upon a commercially-available digital image processing application. For example, in embodiments, a surface analyzing application can be based upon or include a digital image processing application commercially-available from Verity IA LLC of Appleton, Wis., such as the computer program marketed under the name Verity IA Print Target, v3.56.3, for example.

In embodiments, the surface analyzing application 27 includes a Stochastic Frequency Distribution Analysis (SFDA) module, a grayscale conversion module, a sensitivity enhancement module, a mottle computational module, a topography computational module, and a composite smoothness computational module. In embodiments, the surface analyzing application 27 can include other modules and features that are configured to carry out one or more features of a method for determining a surface smoothness of a facing material following principles of the present disclosure, as will be appreciated by one skilled in the art.

Figure 4:
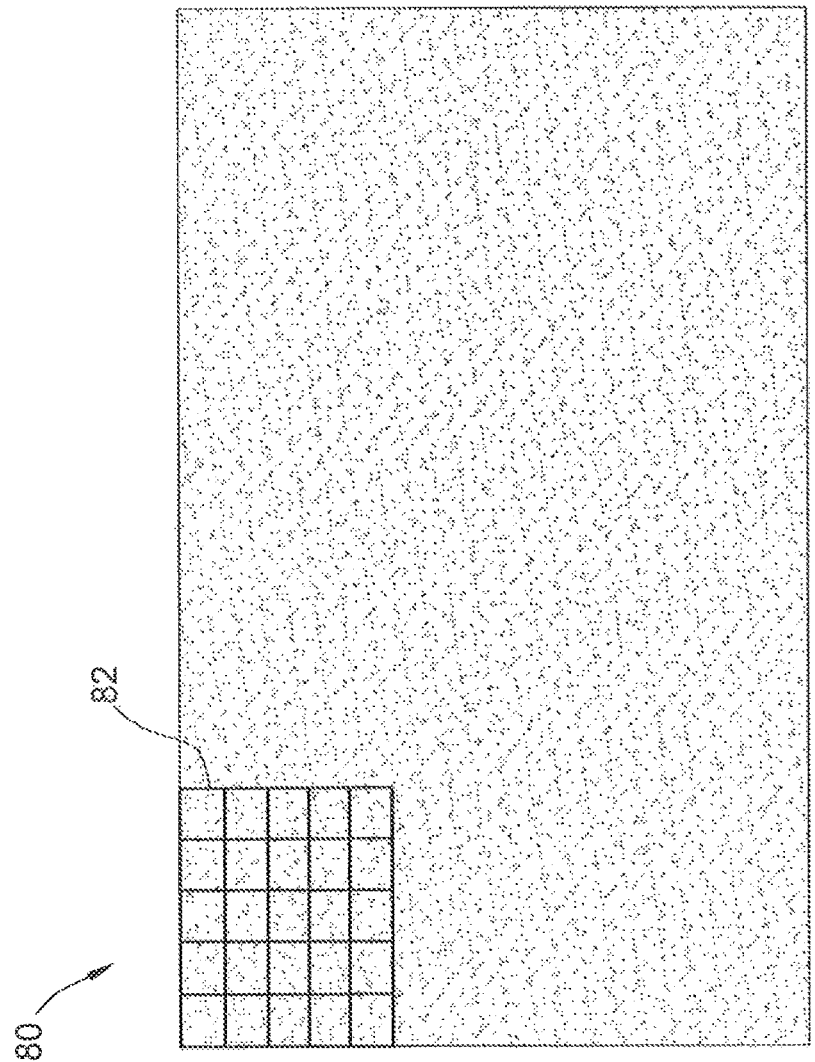
FIG. 4 is a schematic view of an exemplary specimen having a segment of notional pixel target areas displayed thereon for use with embodiments of a system and a method for determining a surface smoothness of a facing specimen following principles of the present disclosure.
Figure 5:
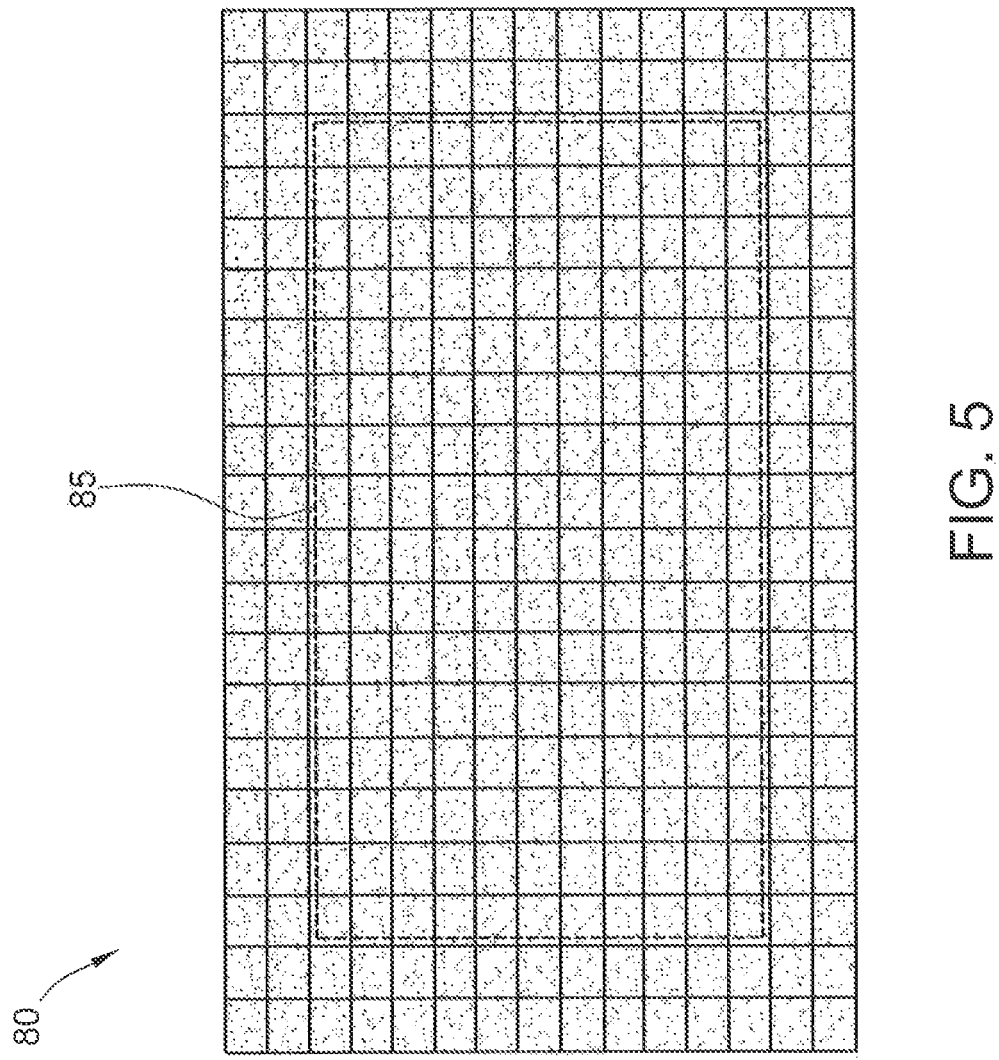
FIG. 5 is a schematic view as in FIG. 4, but having notional pixel target areas displayed substantially over the surface of the specimen.
Figure 6:
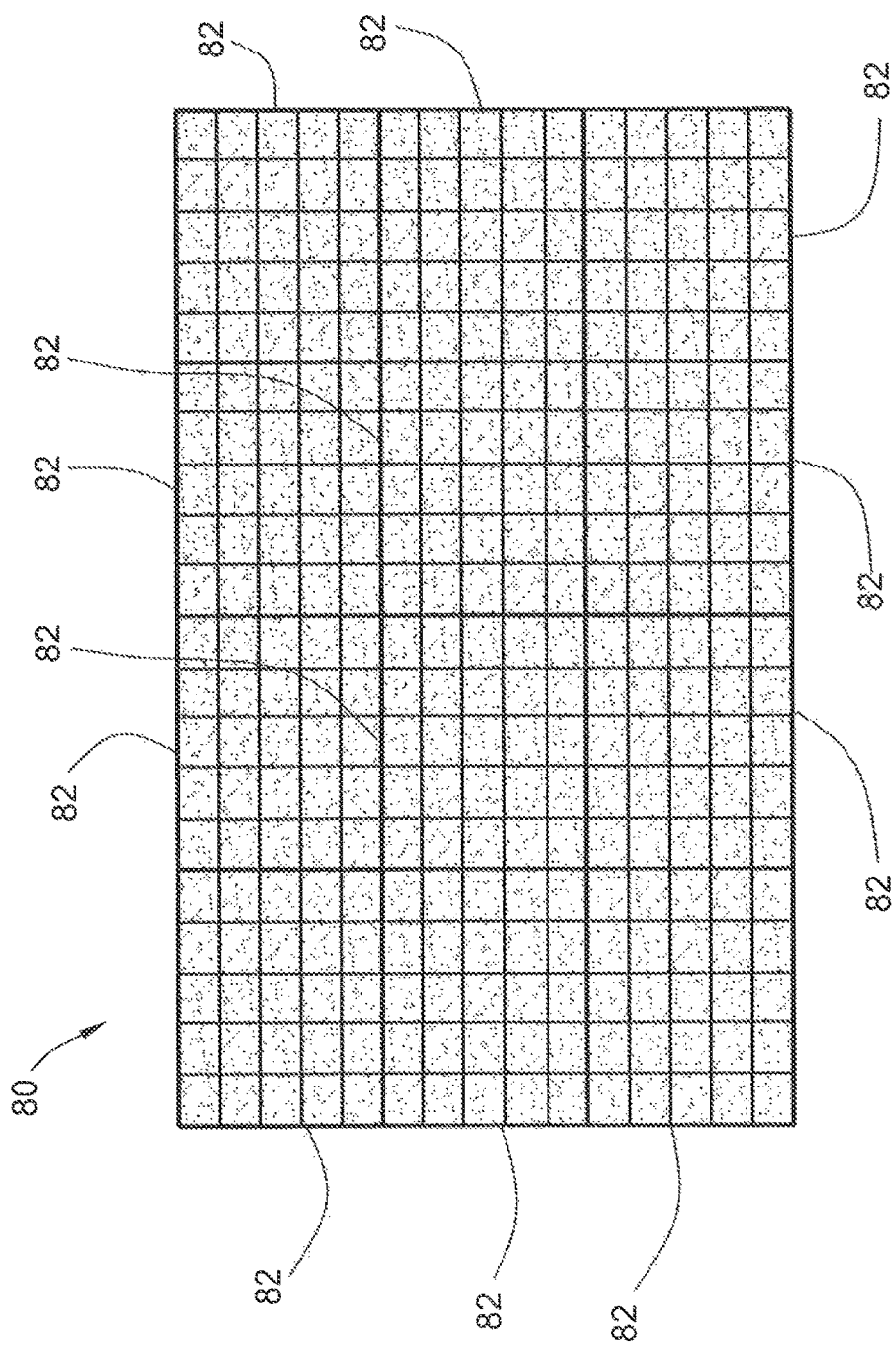
FIG. 6 is a schematic view as in FIG. 5, but having the notional pixel target areas grouped in a series of segments of target areas.

In embodiments, the SFDA module is configured to measure the two dimensional rate of change in luminance values, or transitions between light and dark, from one pixel to the next and/or from one target area to the next. Referring to FIGS. 4-6, the SFDA module can extract square contiguous target areas 82 of the same pixel dimensions (e.g., a five pixel by five pixel target area) from a digital image 80 received from the digital imaging device 25. In embodiments, the number and size of the target areas 82 can vary. In embodiments, the SFDA module is configured to compute the statistical variance of the luminance values for all pixel points within each target area shown in FIG. 5 and to record the statistical variance data in a matrix database of the same dimensions as the target matrix.

The individual variances can be grouped into target groups containing the same number of smaller target area variances, in the illustrated embodiment twenty-five each (see FIG. 4). The variances of the variance of twenty-five small targets in each of the larger area of interest (shown in FIG. 6), in the illustrated example a total of twelve target groups, can be recorded in another database where the variance of those variances is proportional to the spatial distribution of the image texture.

The overall texture of the digital image is proportional to the variance of the variances in the target areas (shown in FIG. 5). In embodiments, the surface analyzing application 27 can be configured to allow a user to select an area of interest 85 within the digital image 80 for evaluation such that only the area of interest 85 is analyzed by the SFDA module.

In embodiments, the grayscale conversion module is configured to convert a color digital image received from the digital imaging device 25 to a grayscale digital image. Converting a color digital image to a grayscale digital image can help avoid luminance detection errors attributable to a false darker reading, for example, based upon the presence of a dark color. In embodiments, the grayscale digital image produced by the grayscale conversion module has an absolute light reflectance (luminance) value for each pixel in a range between 0 and 255, regardless of the original color attributed to that particular pixel in the original digital image produced by the digital imaging device 25. A pixel luminance value of zero is black, and a pixel luminance value of 255 is white. Pixel luminance values from 1 to 254 constitute varying shades of gray, from darker to lighter, respectively.

In embodiments, the grayscale conversion module can be configured to convert the color digital image into grayscale by any suitable technique. For example, in embodiments, the grayscale conversion module can be configured to convert the color digital image into grayscale by extracting a color from the color digital image to provide a grayscale image, or by separating the color digital image into each of its constituent color parts (e.g., red, green, and blue light component parts) to produce separate grayscale digital images.

In embodiments, the grayscale conversion module can be configured to convert the color digital image into grayscale by combining together the separate grayscale digital images created by separate color components (such as, by averaging the luminance value at each pixel of the separate grayscale digital images). In embodiments, the grayscale conversion module can be configured to convert the color digital image into grayscale by comparing the pixel luminance standard deviation for each of the grayscale digital images generated by separate light component parts. The component part gray scale digital image which has the largest pixel luminance standard deviation can be selected to be used to produce the grayscale digital image for further analysis.

In embodiments, the grayscale conversion module can include a color extraction feature that allows a user to select a color to be eliminated from the process of converting the digital image to grayscale. Color extraction can be a useful enhancement of the mottle and topography measurement. For example, color extraction can be used to acquire the grayscale digital image with an enhanced contrast image over what would be obtained without color extraction.

For example, the facer surface 51 of the facer may have a coating or brightener applied thereto, which is excited by ultra-violet light to emit visible blue light. When using a combined gray-scale digital image obtained from the original color digital image, the coating can have a detrimental effect on measuring the smoothness of the surface of the specimen 50, as the coating can have a tendency to mask the undulations in the surface of the specimen 50. In such situations, for example, the color extraction feature of the grayscale conversion module can be used to eliminate the blue-light component grayscale digital image from further analysis by the grayscale conversion module. In embodiments, the remaining light component grayscale digital images can be combined (by averaging, for example) or can be analyzed to determine which of these has the largest pixel luminance standard deviation (and that one selected for use in producing the grayscale digital image).

The image sensors 47 of the digital imaging device 25 can be configured to register finer gradations in light intensity than is possible by the human eye. It can be difficult for the human eye to distinguish between pixels having luminance values which are numerically different, but close together. For example, most humans find it difficult or impossible to consistently distinguish between pixels having a luminance value of 100 and 101. The increased sensitivity of the digital imaging device 25 can be utilized by using the sensitivity enhancement module of the surface analyzing application. The sensitivity enhancement module can be configured to expand the image contrast so that variation in gray tones can be more readily observable by the human eye.

The use of the sensitivity enhancement module can help reveal mottle and topography even when the digital image appears entirely smooth. The sensitivity enhancement module can be used to act as a scaling function by performing an image enhancement. Preferably, if the sensitivity enhancement module is used to assess the specimen 50, it is applied in the same way for all measurements taken of the same specimen 50.

In embodiments, the sensitivity enhancement module can use the following equation to calculate the adjusted luminance value for each pixel in the enhanced digital image:

$$AL_i = L_i + ((L_i - ML) \times S) + MS \quad \text{(Eq. 1)}$$

where $AL_i$ is the adjusted pixel luminance value for pixel i,
$L_i$ is the original pixel luminance value for pixel i,
ML is the original image mean pixel luminance value,
S is the sensitivity setting, and
MS is the mean shift value.

The Mean Shift Value (MS) in Equation 1 can act to adjust, or shift, the Mean Pixel Luminance Value toward the middle of the visible range (e.g., somewhere approximately midway between 0 and 255). In embodiments, the Mean Shift Value (MS) can be calculated using the following equation:

$$MS = S \times ((ML - 255) + 1) \quad \text{(Eq. 2)}$$

The Mean Shift value helps to prevent the adjusted pixel luminance value from being positioned outside of the usable visible range of 0 to 255. The larger the value for Sensitivity (S), the greater the enhancement of the digital image. In embodiments, the value for Sensitivity (S) is in a range from 0 to 15. In embodiments, the user can de-activate the operation of the sensitivity enhancement module by setting the Sensitivity (S) value to zero in the graphical user interface of the surface analyzing application. In embodiments, a Sensitivity setting of seven can be used as a default setting.

In embodiments the sensitivity enhancement module can display the enhanced digital image on the display device 56 via the graphical user Interface of the surface analyzing application. In embodiments, the user can direct the sensitivity enhancement module to produce another enhanced digital image using a different Sensitivity (S) value to arrive at an appropriate enhanced digital image through an iterative approach. In other embodiments, different techniques can be used to enhance the quality of the original grayscale digital image.

The mottle computational module and the topography computational module can be used to analyze the surface of the specimen of which the enhanced digital image is taken. The mottle and topography measurements are both calculated using the data acquired by the SFDA module. In embodiments, the calculated values for mottle and topography are related to the uniformity of the visible and sub-visible pattern in a selected area of interest of the specimen 50. In embodiments, the value of the calculation for mottle and topography are both inversely related to smoothness such that the lower the value of mottle or topography, the smoother the surface.

In embodiments, the mottle computational module of the surface analyzing application 27 is configured to calculate the non-uniform reflection of light from the facer surface 51 of the specimen 50. In embodiments, the mottle computational module can be configured to compute a mottle value using the standard deviation pixel luminance and the average (or mean) pixel luminance in a given target area within the area of interest of the specimen 50.

In embodiments, data relating to the target areas are stored in two databases: a target area luminance standard deviation ($S_{TL}$) database and a target area average luminance ($M_{TL}$) database. In embodiments, these databases are dimensioned the same as the overall digital image of the specimen 50 to help enable subsequent examination of spatial distribution requiring extraction of specific areas of interest within the image. The target area average luminance ($M_{TL}$) can be calculated as the average luminance of the pixels within a given target area. The target area luminance standard deviation ($S_{TL}$) can be calculated using the following equation:

$$S_{TL} = \sqrt{\frac{\sum_{i=1}^{i=n}(L_i - M_{TL})^2}{n}} \quad \text{(Eq. 3)}$$

Where $S_{TL}$ is the target area luminance standard deviation,
$L_i$ is the pixel luminance value for pixel i,
$M_{TL}$ is the target area average luminance value, and
n is the total number of pixels in the target area.

In embodiments, the mottle computational module can use the target area luminance standard deviation ($S_{TL}$) as an indicator of the two dimensional rate of change in pixel luminance for that target area. In embodiments, the mottle computational module can use the degree of variation among the target area luminance standard deviation ($S_{TL}$) for all of the target areas within the area of interest of the specimen 50 as an indicator of the degree of uniformity among the target areas. In embodiments, the mottle computational module can use the degree of variation among the values of the target area average luminance ($M_{TL}$) for all of the target areas within the area of interest of the specimen 50 as an indicator of the degree of uniformity in the image luminance.

Accordingly, in embodiments, the mottle computational module can calculate the value of the mottle in an area of interest using the following equation:

$$\text{Mottle} = K \times (\sigma S_{TL} \times MS_{TL} \times \sigma M_{TL}) \quad \text{(Eq. 4)}$$

where $\sigma S_{TL}$ is the standard deviation of the values of the target area luminance standard deviation ($S_{TL}$) for each target area within the area of interest,
$M_{TL}$ is the mean of the values of the target area luminance standard deviation ($S_{TL}$) for each target area within the area of interest,
where $\sigma M_{TL}$ is the standard deviation of the values of the target area average luminance ($M_{TL}$) for each target area within the area of interest, and
K is a scaling factor.

In embodiments, the mottle computational module can be configured to segment an area of interest that exceeds a predetermined area into a number of uniformly-divided segments which are analyzed separately as described above using Equations 3 and 4. Each of these segments contains the same number of target areas and each larger segment can be analyzed individually. A mottle value for each segment can then be used to determine a mottle value for the larger area of interest using the following equation:

$$\text{Mottle} = K \times (\sigma \text{Mottle}_S \times M\text{Mottle}_S) \quad \text{(Eq. 5)}$$

where $\sigma \text{Mottle}_S$ is the standard deviation of the values of the mottle calculation for each segment within the area of interest,
$M\text{Mottle}_S$ is the mean of the mottle calculation for each segment within the area of interest, and
K is a scaling factor.

In embodiments, the topography computational module of the surface analyzing application 27 is configured to calculate a numerical value that is correlated to the degree of sub-visible texture of the facer surface 51 of the specimen 50. In embodiments, the topography computational module is configured to measure the luminance value of pixels within an area of interest of the enhanced digital image and to compare the luminance value of adjacent pixels with each other to determine the topography of the surface of the specimen 50. In embodiments, the area of interest is preferably a rectangular area within the enhanced grayscale digital image which has x number of pixel columns and y number of pixel rows. In still other embodiments, the area of interest comprises a square area having x number of pixel columns and x number of pixel rows. In other embodiments, an area of interest with a different shape can be used.

In embodiments, the topography computational module of the surface analyzing application 27 can be configured to effectively rescale the enhanced digital image to create a base digital image having a reduced number of larger pixels as compared to the greater number of smaller pixels found in the enhanced digital image. In embodiments, the rescaling can be achieved by averaging the luminance values of the array of pixels in a target area (e.g., a four pixel by four pixel array or a five pixel by five pixel array) to produce a single average luminance value for the target area.

Figure 7:
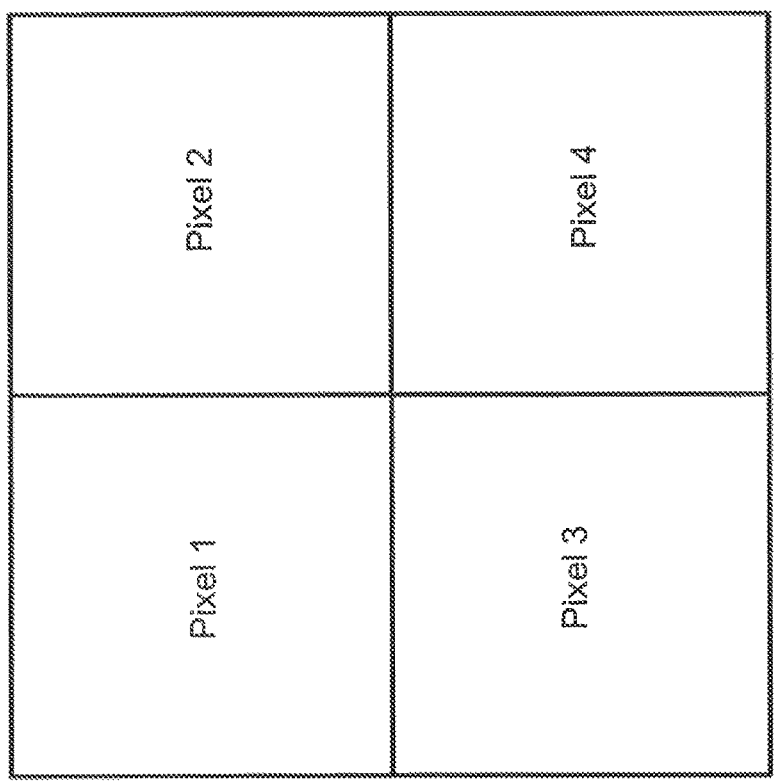
FIG. 7 is a schematic view of a two pixel by two pixel target array for use with embodiments of a system and a method for determining a surface topography of a facing specimen following principles of the present disclosure.
Figure 8:
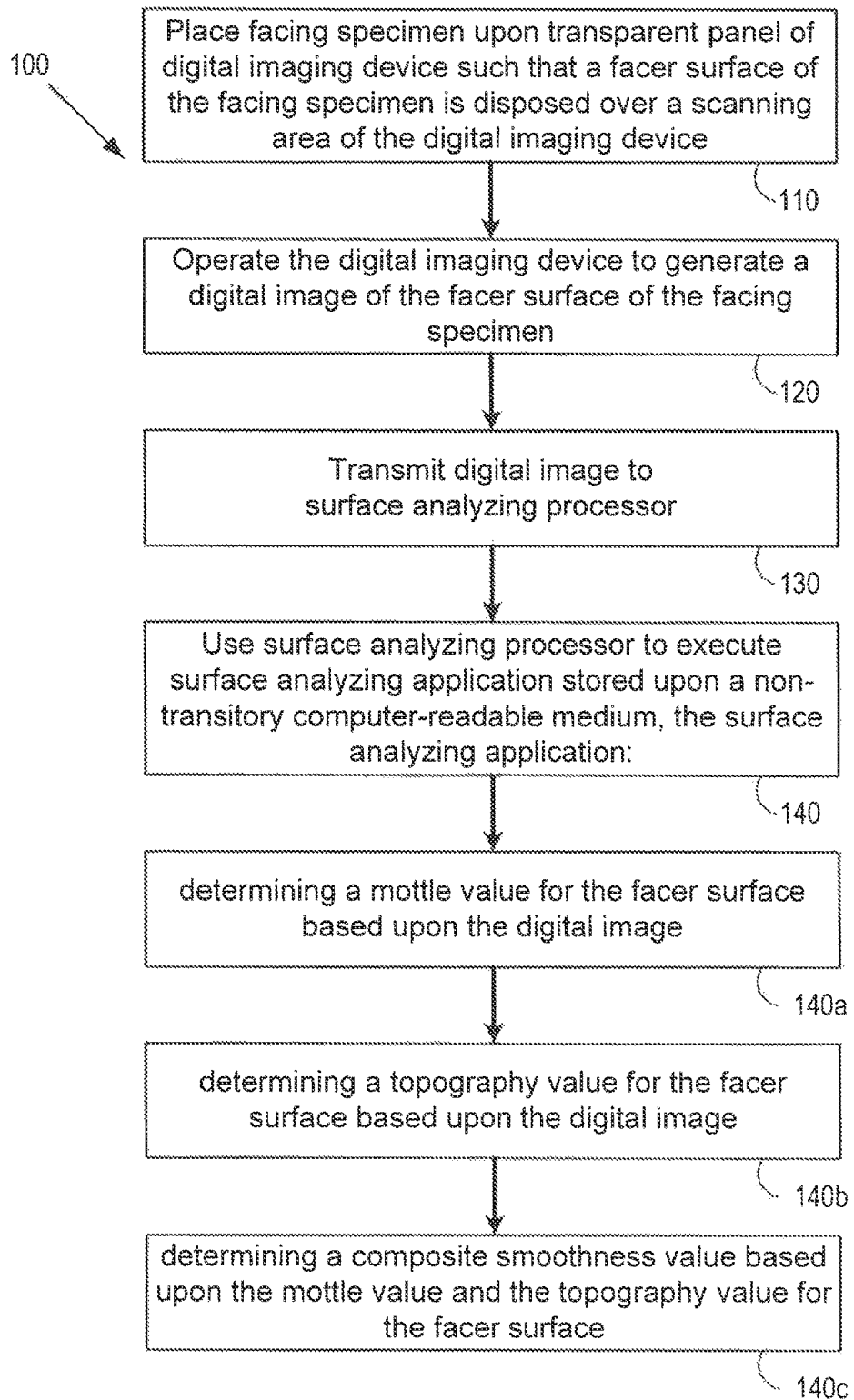
FIG. 8 is a flowchart illustrating steps of an embodiment of a method of determining a surface smoothness of a facing specimen following principles of the present disclosure.

In embodiments, the topography computational module compares the luminance value of each pixel (or each rescaled pixel based upon an average luminance of an array of pixels) with the luminance value of adjacent pixels using a two pixel by two pixel target array (see FIG. 7). In other embodiments, a target array could have a different number of pixels.

In embodiments, the topography computational module of the surface analyzing application 27 is configured to iteratively move over the area of interest to compare pixels within the target array in a series of calculating operations in which the target array is moved over the area of interest. In each calculating operation, the luminance value of each of the pixels falling in the target array which is the subject of the calculating operation is determined and compared with each other.

In embodiments, the topography computational module can be configured to position a first target array at a corner of the area of interest within the digital image and iteratively move the target array along each pixel row of the digital image, or alternatively each pixel column of the digital image, until the target array reaches the end of that row or column. The topography computational module can then re-position the target array back to the beginning end of an adjacent row (or column) and move the target array along that row (or column) as before until the area of interest has been covered.

In embodiments, the topography computational module can use different ways to compare the luminance value of the pixels within a given target array. For example, in embodiments, the topography computational module can calculate for each two by two pixel target array the sum of the absolute differences between the luminance values of the pixels falling in pixel locating areas 1, 2, 3, and 4 using the following equation:

$$\Sigma \Delta L = |\text{Pixel}_1 - \text{Pixel}_2| + |\text{Pixel}_2 - \text{Pixel}_4| + |\text{Pixel}_3 - \text{Pixel}_1| + |\text{Pixel}_1 - \text{Pixel}_4| + |\text{Pixel}_3 - \text{Pixel}_2| \quad \text{(Eq. 6)}$$

In other embodiments, the topography computational module can calculate for each two by two pixel target array the sum of the absolute luminance differences between the luminance values of the pixels falling in pixel locating areas 1, 2, 3, and 4 using the following equation:

$$\Sigma \Delta L = |\text{Pixel}_1 - \text{Pixel}_4| + |\text{Pixel}_3 - \text{Pixel}_2| \quad \text{(Eq. 7)}$$

Equation 7 calculates the sum of the absolute cross differences between the luminance values of only the pixels positioned diagonally across from each other.

The topography computational module can be configured such that its calculation technique identifies whether the pixel luminance values for the pixels in each two by two pixel target array differ greatly. The larger the absolute difference calculation is, the greater the indication that the target array is over an edge of an area of roughness. The smaller the absolute difference calculation is, the greater the indication that the target array is over an area with no or little roughness. In embodiments, either Equation 6 or Equation 7 can be used to calculate the absolute difference.

For each target array considered, the topography computational module can calculate a value for the sum of the absolute luminance differences and the average luminance value of the four pixels in the target array ($L_{avg}$). The topography computational module can store both values in a suitable topography database found in the data storage device associated with the surface analyzing processor 30. At the completion of these two calculations, the topography computational module can move the target array to the next adjacent pixel in that row (or column), repeat the calculations, and store the results in the topography database until the area of interest has been covered.

Once the target array has been moved over the entire area of interest, the topography computational module can be configured to use the tabulated data in the database relating to the sum of the absolute luminance differences to calculate a standard deviation (SDΣΔL) and the average (MΣΔL) of the obtained absolute difference (or absolute cross difference) luminance values for the target arrays within area of Interest. The topography computational module can be configured to calculate a standard deviation of the average luminance values ($L_{avg}$) for the target arrays within area of interest ($SDL_{avg}$). The topography computational module can be configured to store these values in the topography database.

In embodiments, the topography computational module can be configured to calculate a topography value using at least the standard deviation (SDΣΔL) and the average (MΣΔL) of the obtained absolute difference (or absolute cross difference) luminance values for the target arrays within area of interest. In embodiments, the topography computational module is configured to calculate a topography value using the standard deviation (SDΣΔL) and the mean average (MΣΔL) of the obtained absolute difference (or absolute cross difference) luminance values and the standard deviation of the average luminance values ($SDL_{avg}$) for the target arrays within area of interest. For example, in embodiments, the topography computational module is configured to calculate a topography value using the following equation:

$$\text{Topography} = SD\Sigma\Delta L \times M\Sigma\Delta L \times SDL_{avg} \qquad \text{(Eq. 8)}$$

where SDΣΔL is the standard deviation of the obtained absolute difference (or absolute cross difference) luminance values for the target arrays within the area of interest, MΣΔL is the average of the obtained absolute difference (or absolute cross difference) luminance values for the target arrays within the area of interest, and $SDL_{avg}$ is the standard deviation of the average luminance values for the target arrays within the area of interest.

The value of the average of the obtained absolute difference (or absolute cross difference) luminance values for the target arrays within area of interest can be considered to relate to the rate of change of surface roughness within the area of interest of the specimen 50. The value of standard deviation of the obtained absolute difference (or absolute cross difference) luminance values for the target arrays within the area of interest can demonstrate how much uniformity exists in the value of the average (MΣΔL). Thus the product of these two terms can provide an indication as to the surface roughness of the specimen 50. The standard deviation of the average luminance values for the target arrays within the area of interest can be considered to relate to the uniformity of the luminance values of the pixels within the digital image and can help to make the topography calculation responsive to spatial distribution.

In general, a topographic number of zero indicates that the surface of the specimen 50, whether rough or smooth, is uniform such that any roughness is uniformly distributed over the surface of the specimen 50. The larger the topography number is, the more that the roughness of the surface is not uniformly distributed.

In embodiments, the composite smoothness computational module of the surface analyzing application 27 is configured to determine the composite smoothness value based upon the equation:

$$S = (0.5M) + (0.5T) \qquad \text{(Eq. 9)}$$

where S is the composite smoothness value of the facing specimen,

M is the mottle value of the facing specimen, and

T is the topography value of the facing specimen.

In embodiments, the composite smoothness computational module of the surface analyzing application 27 is configured to calculate a composite smoothness value based upon the mottle value and the topography value determined by the surface analyzing application 27 for two different specimens to generate a numerical comparison of the relative smoothness of the two specimens. For example, in embodiments, the composite smoothness computational module can be configured to calculate a value for the composite smoothness of one specimen relative to another using the following equation:

$$S_{ij} = (0.5 \times \% \, \Delta M_{ij}) + (0.5 \times \% \, \Delta T_{ij}) \qquad \text{(Eq. 10)}$$

where $S_{ij}$ is the smoothness of specimen I relative to specimen J,

% $\Delta M_{ij}$ is the percent mottle change of the specimen I relative to specimen J, and % $\Delta T_{ij}$ is the percent topography change of the specimen I relative to specimen J.

The percent mottle change of the specimen I relative to specimen J can be calculated using the following formula:

$$\% \, \Delta M_{ij} = \frac{(M_j - M_i)}{M_j} \times 100\% \qquad \text{(Eq. 11)}$$

where $M_i$ is the mottle of specimen I, and $M_j$ is the mottle of specimen J.

The percent topography change of the specimen I relative to specimen J can be calculated using the following formula:

$$\% \, \Delta T_{ij} = \frac{(T_j - T_i)}{T_j} \times 100\% \qquad \text{(Eq. 12)}$$

where $T_i$ is the topography of specimen I, and $T_j$ is the topography of specimen J.

Embodiments of a method of determining a surface smoothness of a facing specimen can be carried out using a system of determining a surface smoothness of a facing specimen following principles of the present disclosure. In one embodiment of a method 100 of determining a surface smoothness of a facing specimen, the facing specimen is placed upon a transparent panel of a digital imaging device such that a facer surface of the facing specimen is disposed over a scanning area of the digital imaging device (step 110). The digital imaging device is operated to generate a digital image of the facer surface of the facing specimen (step 120). The digital image is transmitted to a surface analyzing processor (step 130). The surface analyzing processor is used to execute a surface analyzing application stored upon a non-transitory computer-readable medium (step 140). The surface analyzing application determines a mottle value for the facer surface based upon the digital image (step 140a), determines a topography value for the facer surface based upon the digital image (step 140b), and determines a composite smoothness value based upon the mottle value and the topography value for the facer surface (step 140c).

In one embodiment, a specimen is taken from a supply of facer material. For example, in embodiments, a square-shaped specimen is taken from the supply of facer material.

In embodiments, the specimen has a greater size than a predetermined area of interest to use with the surface analyzing application. For example, in embodiments, a specimen is taken that is 8.5 inches by 8.5 inches, and will be used with an area of interest set at seven inches by seven inches. In embodiments where the specimen comprises a board product to which the facer is applied, the specimen can be taken a predetermined distance from any edge of the board product. For example, in embodiments where the specimen comprises a gypsum wallboard, the specimen can be taken so that it is offset a predetermined distance (e.g., at least four and a half inches) from the tapered edges of the board.

In embodiments, the specimen is cleaned and otherwise prepared so that the facer surface is substantially free of markings or ink. The transparent panel of the digital imaging device is cleaned. The specimen can be placed upon the transparent panel with the surface of the facer being analyzed against the transparent panel.

In embodiments, operating the digital imaging device to generate the digital image of the facer surface of the facing specimen includes moving a carriage of the digital imaging device along a scanning axis to traverse the scanning area. The facer surface of the facing specimen is illuminated by the light source within the digital imaging device. An array of image sensors mounted to the carriage detects an amount of light reflected from the facer surface such that the digital image includes luminance data corresponding to luminance value signals respectively generated by the array of image sensors over a matrix of pixels defining the digital image.

The surface analyzing processor can be operated to execute the surface analyzing application. The digital imaging device can be linked to the surface analyzing application through the graphical user interface. The resolution of the digital image can be set. For example, in embodiments, the resolution is set to be 600 ppi or greater.

The area of interest within the digital image can be set. In embodiments, the surface analyzing application uses an area of interest within the digital image for determining the mottle value, the topography value, and the composite smoothness value.

The graphical user interface can be used to select whether a color extraction feature of the grayscale conversion module of the surface analyzing application is activated. For example, in embodiments, the color blue can be removed from the grayscale conversion process.

The graphical user interface can be used to select whether the sensitivity enhancement feature of the surface analyzing application is activated. For example, in embodiments, a sensitivity value can be set anywhere from 0 to 15 wherein a setting of zero indicates the enhancement feature is deactivated. The digital imaging device can be activated to obtain a digital image of the surface of the specimen.

The surface analyzing application can perform various processing steps using the parameter settings input by the user, including sensitivity value, color extraction, and surface values to be computed (e.g., mottle and/or topography). The surface analyzing application can convert a color image generated by the digital imaging device to grayscale using the sensitivity enhancement and color extraction settings input by the user. The SFDA module, the mottle computational module, and the topography computational module can be used to generate mottle and topography values for the area of interest set by the user. In embodiments, the surface analyzing application determines the composite smoothness value based upon Equation 9. The surface analyzing application can be executed to export the obtained results to another program (e.g., Excel) and/or to save the data to the data storage device operably arranged with the surface analyzing processor.

In embodiments, operating the digital imaging device includes moving a carriage of the digital imaging device along a scanning axis to generate the digital image of the facer surface of the facing specimen. The carriage bears an array of image sensors. The step of placing the facing specimen upon the transparent panel of the digital imaging device can include positioning the facing specimen in a first orientation. The method can further include repositioning the facing specimen upon the transparent panel of the digital imaging device such that the facing specimen is in a second orientation which is different from the first orientation. The digital imaging device can be operated to generate a second digital image of the facer surface of the facing specimen in the second orientation by moving the carriage of the digital imaging device along the scanning axis to generate the second digital image. The surface analyzing application: determines a second mottle value for the facer surface based upon the second digital image, calculates an average mottle value based upon the first mottle value and the second mottle value, determines a second topography value for the facer surface based upon the second digital image, calculates an average topography value based upon the first topography value and the second topography value, and determines the composite smoothness value based upon the average mottle value and the average topography value for the facer surface.

In at least some of such embodiments, the scanning axis is substantially parallel to a first dimension of the facing specimen when the facing specimen is in the first orientation. The scanning axis is substantially parallel to a second dimension when the facing specimen is in the second orientation, and the first dimension is substantially perpendicular to the second dimension. In some embodiments, the first direction is substantially aligned with a machine direction of the facer, and the second direction is substantially aligned with a cross-machine direction of the facer.

In embodiments, a number of specimens are analyzed to determine a range of acceptable mottle, topographic, and/or composite smoothness numbers to be used as a specification for a desired surface smoothness. Adjustments to the color extraction, enhancement and/or re-scaling of the obtained digital image can affect the values for topography and mottle (and thus also the composite smoothness). Accordingly, it is preferred that parameter settings remain the same when testing a batch of similar specimens to improve the relative comparison of the obtained values. Thus the mottle, topography, and composite smoothness numbers can be more useful for comparison purposes between different specimens (e.g., a control specimen and one or more test specimens) when the parameter settings remain substantially the same.

In embodiments, the method includes placing a reference facing specimen upon the transparent panel of the digital imaging device such that a facer surface of the reference facing specimen is disposed over the scanning area of the digital imaging device. The digital imaging device is operated to generate a reference digital image of the facer surface of the reference facing specimen. The reference digital image is transmitted to the surface analyzing processor. The surface analyzing processor is used to execute the surface analyzing application stored upon a non-transitory computer-readable medium. The surface analyzing application: determines a second mottle value for the facer surface of the reference facing specimen based upon the reference digital image, determines a second topography value for the facer surface of the reference facing specimen based upon the reference digital image, and determines the composite smoothness value for the first facing specimen based upon a first difference between the second mottle value and the first mottle value and a second difference between the second topography value and the first topography value.

In at least some of such embodiments, the surface analyzing application determines the composite smoothness value using Equation 10. The surface analyzing application can determine the percent mottle change using Equation 11. The surface analyzing application can determine the percent topography change using Equation 12.

EXAMPLES

In the following Examples, a method of determining a surface smoothness of a facing specimen following principles of the present disclosure was used to generate various mottle, topography, and composite smoothness values. In the various Examples, the Epson® Perfection® V750 Pro scanner was used as the digital imaging device 25 and was connected to a standard personal computer loaded with the digital image processing application commercially-available from Verity IA LLC of Appleton, Wis., under the name Verity IA Print Target, v3.56.3. The Verity IA digital image processing application was used to generate values for topography and mottle using the following exemplary parameter settings. The sensitivity value was set at 7. The resolution was set at 600 ppi. The area of interest was set as a seven inches by seven inch square which was established to be at least half an inch from any edge of the specimen. The color extraction feature was activated, and blue was chosen. The values obtained for mottle and topography were selectively loaded into a suitable composite smoothness computational module to determine composite smoothness values as set forth below.

Example 1

In this Example, various paper facer specimens were analyzed. As indicated, each paper facer specimen was analyzed with the paper specimen oriented in two different directions. When the paper facer specimen was oriented in the machine direction (MD), the movement of the carriage holding the light sensors of the imaging device moved generally parallel with the machine direction of the paper specimen (i.e., the longitudinal direction of the web of the paper facer material from which the specimen was taken). When the paper facer specimen was oriented in the cross direction (CD), the movement of the carriage holding the light sensors of the imaging device moved generally perpendicular to the machine direction of the paper specimen and parallel to the narrow dimension of the web of the paper facer material.

The results of the analysis using a method of determining a surface smoothness of a facing specimen following principles of the present disclosure are set forth below in Table I. In general, it was observed that the values for Mottle and Topography both increased for a given paper facer specimen when the specimen was oriented in the cross direction (CD) relative to the machine direction (MD). The average of the respective mottle and topography values in both the machine direction (MD) and the cross direction (CD) for each paper facer specimen was also computed.

Paper Facer Specimens A and B were sourced from one supplier, and Paper Facer Specimens C-F from another. In general, the analysis set forth in Table I shows that the paper form the first supplier is relatively smoother than that from the second supplier. Also, the analysis of Paper Facer Specimens C-F shows that a given paper generally becomes smoother when it is made with a heavier basis weight. The weight of the paper facer specimens is expressed in pounds per thousand square feet of paper, as is commonly used in the art.

TABLE I

Paper Facer Comparison

| Paper | Weight (lbs/msf) | Direction | Mottle | Topography | Mottle Avg. (MD & CD) | Topography Avg. (MD & CD) |
| --- | --- | --- | --- | --- | --- | --- |
| Paper A | 48 | MD | 56.4 | 631 | 64 | 817 |
|  |  | CD | 72.2 | 1002 |  |  |
| Paper B | 48 | MD | 36.5 | 465 | 55 | 698 |
|  |  | CD | 74.1 | 931 |  |  |
| Paper C | 39 | MD | 98.6 | 910 | 137 | 1255 |
|  |  | CD | 176 | 1599 |  |  |
| Paper D | 40 | MD | 80.9 | 809 | 122 | 1167 |
|  |  | CD | 164 | 1524 |  |  |
| Paper E | 48 | MD | 60.5 | 616 | 99 | 1098 |
|  |  | CD | 138 | 1580 |  |  |
| Paper F | 54 | MD | 58.6 | 590 | 89 | 925 |
|  |  | CD | 119 | 1260 |  |  |

Example 2

In this Example, the average topography and mottle values obtained in Example 1 were used to calculate the respective composite smoothness values for Paper Facer Specimens A, C, D, E, and F relative to paper Facer Specimen B. The results are set forth in Table II below. A negative value for composite smoothness indicates the test specimen is relatively rougher than the control specimen (Paper Facer B), and a positive value for composite smoothness indicates the test specimen is relatively smoother than the control specimen. According to the computed composite smoothness values, Paper Facer Specimens A, C, D, E, and F are each rougher than Paper Facer Specimen B.

TABLE II

Paper Facer Comparison

| Paper | Mottle Avg. (MD & CD) | Topography Avg. (MD & CD) | % ΔM | % ΔT | S |
|---|---|---|---|---|---|
| Paper B | 55 | 698 | — | — | — |
| Paper A | 64 | 817 | −17 | −17 | −17 |
| Paper C | 137 | 1255 | −150 | −80 | −115 |
| Paper D | 122 | 1167 | −123 | −67 | −95 |
| Paper E | 99 | 1098 | −80 | −57 | −89 |
| Paper F | 89 | 925 | −61 | −33 | −47 |

Example 3

In this Example, various glass mat specimens were analyzed using a method of determining a surface smoothness of a facing specimen following principles of the present disclosure. As indicated, several of the glass mats were analyzed both as a specimen on its own, and then subsequently after the glass mat was used to produce a glass mat interior gypsum board. As in Example 1, Mottle and Topography values were obtained with the Glass Mat Specimens oriented in both the machine direction (MD) and the cross direction (CD). These results were then averaged together. The averaged results of the analysis using a method of determining a surface smoothness of a facing specimen following principles of the present disclosure are set forth below in Table III. In general, it was observed for these Specimens that the values for mottle generally increased and the values for topography generally decreased when the glass mat was assembled into a glass mat interior gypsum board.

TABLE III

Glass Mat Comparison

| | Mat Alone | | Board | |
|---|---|---|---|---|
| Glass Mat | Mottle Avg. | Topography Avg. | Mottle Avg. | Topography Avg. |
| Glass Mat A | 282 | 5428 | 220 | 3369 |
| Glass Mat B | 286 | 8387 | 381 | 6808 |
| Glass Mat C | 260 | 7611 | 460 | 6935 |
| Glass Mat D (coated) | 270 | 5785 | 384 | 5352 |
| Glass Mat E | 280 | 7685 | 426 | 6465 |
| Glass Mat F | — | — | 129 | 2510 |

Example 4

In this Example, the topography and mottle values obtained in Example 3 were used to calculate the respective composite smoothness values for Glass Mat Specimens B-F relative to Glass Mat Specimen A using Equation 11. The results are set forth in Table IV below. A negative value for composite smoothness indicates the test specimen is relatively rougher than the control specimen (Glass Mat A), and a positive value for composite smoothness indicates the test specimen is relatively smoother than the control specimen.

TABLE IV

Glass Mat Comparison

| | Mat Alone | | | Board | | |
|---|---|---|---|---|---|---|
| Glass Mat | % ΔM | % ΔT | S | % ΔM | % ΔT | S |
| Glass Mat A | — | — | — | — | — | — |
| Glass Mat B | −1 | −55 | −28 | −73 | −102 | −88 |
| Glass Mat C | +8 | −40 | −16 | −109 | −106 | −108 |
| Glass Mat D (coated) | +4 | −7 | −1 | −74 | −59 | −67 |
| Glass Mat E | +1 | −42 | −20 | −93 | −92 | −93 |
| Glass Mat F | — | — | — | +41 | +25 | +33 |

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for determining a surface smoothness of a facer surface of a facing specimen, the system comprising:

a digital imaging device, the digital imaging device configured to generate a digital image of the facing specimen, the digital imaging device including a housing, a transparent panel, and at least one image sensor, the housing defining a scanning area, the transparent panel being mounted to the housing over the scanning area, and each of said at least one image sensor being configured to generate digital image data relating to the facer surface placed upon the transparent panel for generating the digital image;

a non-transitory, computer-readable medium, the non-transitory, computer-readable medium bearing a surface analyzing application; and a surface analyzing processor, the surface analyzing processor being in operable arrangement with the digital imaging device to receive the digital image therefrom and being in operable arrangement with the non-transitory, computer-readable medium to execute the surface analyzing application;

wherein the surface analyzing application includes a mottle computational module configured to determine a mottle value for the facer surface based upon the digital image, a topography computational module configured to determine a topography value for the facer surface based upon the digital image, and a composite smoothness computational module configured to determine a composite smoothness value based upon the mottle value and the topography value for the facer surface, and a graphical user interface module configured to receive input from a user and to display output from the surface analyzing application;

a display device, the display device operably arranged with the processor to display the graphical user interface.

2. The system according to claim 1, wherein the digital imaging device includes a carriage, the carriage disposed within the housing and reciprocally movable over a range of travel along a scanning axis to traverse the scanning area, said at least one image sensor mounted to the carriage.

3. The system according to claim 1, wherein the digital imaging device includes a light source, the light source disposed within the housing and configured to illuminate the facer surface when the facing specimen is placed upon the transparent panel.

4. The system according to claim 3, wherein the digital imaging device includes a carriage, the carriage disposed within the housing and reciprocally movable over a range of travel along a scanning axis to traverse the scanning area, said at least one image sensor mounted to the carriage.

5. The system according to claim 4, wherein the carriage holds an array of image sensors, each image sensor being configured to convert an amount of light sensed by each respective image sensor into a luminance value signal, the digital image including luminance data corresponding to the luminance value signals respectively generated by the array of image sensors over a matrix of pixels defining the digital image.

6. The system according to claim 1, wherein the composite smoothness computational module of the surface analyzing application is configured to determine the composite smoothness value based upon the equation:

$$S=(0.5M)+(0.5T)$$

where S is the composite smoothness value of the facing specimen,
M is the mottle value of the facing specimen, and
T is the topography value of the facing specimen.

7. A method of determining a surface smoothness of a facing specimen, the method comprising:
placing the facing specimen upon a transparent panel of a digital imaging device such that a facer surface of the facing specimen is disposed over a scanning area of the digital imaging device;
operating the digital imaging device to generate a digital image of the facer surface of the facing specimen;
transmitting the digital image to a surface analyzing processor;
using the surface analyzing processor to execute a surface analyzing application stored upon a non-transitory computer-readable medium, the surface analyzing application:
determining a mottle value for the facer surface based upon the digital image,
determining a topography value for the facer surface based upon the digital image, and
determining a composite smoothness value based upon the mottle value and the topography value for the facer surface.

8. The method according to claim 7, further comprising:
preparing the facing specimen so that the facer surface of the facing specimen is substantially free of ink markings.

9. The method according to claim 7, further comprising:
preparing the facing specimen by taking the facing specimen from a supply of facer material.

10. The method according to claim 7, further comprising:
preparing the facing specimen by taking the facing specimen from a board product.

11. The method according to claim 7, wherein the surface analyzing application uses an area of interest within the digital image for determining the mottle value, the topography value, and the composite smoothness value.

12. The method according to claim 7, wherein operating the digital imaging device to generate the digital image of the facer surface of the facing specimen includes moving a carriage of the digital imaging device along a scanning axis to traverse the scanning area, illuminating the facer surface of the facing specimen, and detecting, by an array of image sensors mounted to the carriage, an amount of light reflected from the facer surface such that the digital image includes luminance data corresponding to luminance value signals respectively generated by the array of image sensors over a matrix of pixels defining the digital image.

13. The method according to claim 7, wherein the surface analyzing application determines the composite smoothness value based upon the equation:

$$S=(0.5M)+(0.5T)$$

where S is the composite smoothness value of the facing specimen,
M is the mottle value of the facing specimen, and
T is the topography value of the facing specimen.

14. The method according to claim 7, wherein the digital image, the mottle value, and the topography value comprise a first digital image, a first mottle value, and a first topography value, respectively, wherein operating the digital imaging device includes moving a carriage of the digital imaging device along a scanning axis to generate the digital image of the facer surface of the facing specimen, the carriage bearing an array of image sensors, and wherein placing the facing specimen upon the transparent panel of the digital imaging device includes positioning the facing specimen in a first orientation, the method further comprising:

repositioning the facing specimen upon the transparent panel of the digital imaging device such that the facing specimen is in a second orientation, the second orientation being different from the first orientation;

operating the digital imaging device to generate a second digital image of the facer surface of the facing specimen by moving the carriage of the digital imaging device along the scanning axis to generate the second digital image;

wherein the surface analyzing application:
  determines a second mottle value for the facer surface based upon the second digital image,
  calculates an average mottle value based upon the first mottle value and the second mottle value,
  determines a second topography value for the facer surface based upon the second digital image,
  calculates an average topography value based upon the first topography value and the second topography value, and
  determines the composite smoothness value based upon the average mottle value and the average topography value for the facer surface.

15. The method according to claim 14, wherein the scanning axis extends along a first dimension of the facing specimen when the facing specimen is in the first orientation, and the scanning axis extends along a second dimension when the facing specimen is in the second orientation, the first dimension being different from the second dimension.

16. The method according to claim 7, wherein the facing specimen, the digital image, the mottle value, and the topography value comprise a first specimen, a first digital image, a first mottle value, and a first topography value, respectively, the method further comprising:

placing a reference facing specimen upon the transparent panel of the digital imaging device such that a facer surface of the reference facing specimen is disposed over the scanning area of the digital imaging device;

operating the digital imaging device to generate a reference digital image of the facer surface of the reference facing specimen;

transmitting the reference digital image to the surface analyzing processor;

using the surface analyzing processor to execute the surface analyzing application stored upon a non-transitory computer-readable medium, the surface analyzing application:
  determining a second mottle value for the facer surface of the reference facing specimen based upon the reference digital image,
  determining a second topography value for the facer surface of the reference facing specimen based upon the reference digital image, and
  determining the composite smoothness value for the first facing specimen based upon a first difference between the second mottle value and the first mottle value and a second difference between the second topography value and the first topography value.

17. The method according to claim 16, wherein the surface analyzing application determines the composite smoothness value using the equation:

$$S_{ij} = (0.5 \times \% \, \Delta M_{ij}) + (0.5 \times \% \, \Delta T_{ij})$$

where $S_{ij}$ is the composite smoothness value of the first facing specimen (I) relative to the reference facing specimen (J), $\% \, \Delta M_{ij}$ is a percent mottle change of the first facing specimen (I) relative to the reference facing specimen (J), and $\% \, \Delta T_{ij}$ is a percent topography change of the first facing specimen (I) relative to the reference facing specimen (J).

18. The method according to claim 17, wherein the surface analyzing application determines the percent mottle change using the equation:

$$\% \, \Delta M_{ij} = \frac{(M_j - M_i)}{M_j} \times 100\%$$

where $M_i$ is the first mottle value of the first facing specimen (I), and $M_j$ is the second mottle value of the reference facing specimen (J).

19. The method according to claim 18, wherein the surface analyzing application determines the percent topography change using the equation:

$$\% \, \Delta T_{ij} = \frac{(T_j - T_i)}{T_j} \times 100\%$$

where $T_i$ is the first topography value of the first facing specimen (I), and $T_j$ is the second topography value of the reference facing specimen (J).

* * * * *